(12) United States Patent
Jang (10) Patent No.: US 9,421,920 B2
(45) Date of Patent: Aug. 23, 2016

(54) MOBILE DEVICE ACCESSORY AND APPARATUS FOR MOUNTING THE SAME ON AN AUTOMOTIVE

(71) Applicant: AAUXX KOREA CO., LTD, Seoul (KR)

(72) Inventor: Jintae Jang, Seoul (KR)

(73) Assignee: AAUXX KOREA CO., LTD, Seoul (KR)

( * ) Notice: Subject to any disclaimer, the term of this patent is extended or adjusted under 35 U.S.C. 154(b) by 0 days.

(21) Appl. No.: 14/378,183

(22) PCT Filed: Apr. 2, 2014

(86) PCT No.: PCT/KR2014/002857
§ 371 (c)(1),
(2) Date: Aug. 12, 2014

(87) PCT Pub. No.: WO2014/168374
PCT Pub. Date: Oct. 16, 2014

(65) Prior Publication Data
US 2016/0039357 A1    Feb. 11, 2016

(30) Foreign Application Priority Data

Apr. 12, 2013    (KR) .................. 10-2013-0040554
Dec. 31, 2013    (KR) .................. 20-2013-0010931

(51) Int. Cl.
*F16M 13/02*    (2006.01)
*B60R 11/02*    (2006.01)
(Continued)

(52) U.S. Cl.
CPC .............. *B60R 11/0252* (2013.01); *A45F 5/00* (2013.01); *B60R 11/00* (2013.01); *F16M 13/022* (2013.01);
(Continued)

(58) Field of Classification Search
CPC ... B60R 11/02; B60R 2011/0005; A45F 5/00; F16M 13/02
See application file for complete search history.

(56) References Cited

U.S. PATENT DOCUMENTS 6,522,748 B1 *    2/2003    Wang ..................... B60R 11/02
                                                      379/446
6,888,940 B1 *    5/2005    Deppen ............... B60R 11/0241
                                                      379/446
(Continued)

FOREIGN PATENT DOCUMENTS

JP    2011-58607    3/2011
JP    3170743    9/2011
(Continued)

OTHER PUBLICATIONS

International Search Report for International Application No. PCT/KR2014/002857, dated Jun. 25, 2014.
(Continued)

*Primary Examiner* — Brian D Nash
(74) *Attorney, Agent, or Firm* — Kile Park Reed & Houtteman PLLC (57) ABSTRACT

The mobile device accessory includes a fixing plate to be fixed to a surface of a mobile device, a ring having an opening portion at a side thereof and a connecting member connecting the opening portion of the ring with the fixing plate such that the ring is configured to rotate to have various angles with respect to the fixing plate and an angle between the ring and the fixing plate is configured to maintain. Thus, the mobile device accessory may make the ring have various angles and the ring maintain a specific angle to carry or position the mobile device conveniently.

10 Claims, 4 Drawing Sheets

(51) Int. Cl.
*A45F 5/00* (2006.01)
*H04B 1/3877* (2015.01)
*H04M 1/04* (2006.01)
*B60R 11/00* (2006.01)

(52) U.S. Cl.
CPC ............... *H04B 1/3877* (2013.01); *H04M 1/04* (2013.01); *A45F 2005/008* (2013.01); *A45F 2200/0516* (2013.01); *B60R 2011/0003* (2013.01); *B60R 2011/008* (2013.01)

(56) References Cited

U.S. PATENT DOCUMENTS

| | | | |
|---|---|---|---|
| 2006/0140395 A1* | 6/2006 | Kim | A45F 5/02 379/428.01 |
| 2007/0215659 A1* | 9/2007 | Knapp | A45F 5/02 224/269 |
| 2009/0090750 A1* | 4/2009 | Alcenat | A45F 5/00 224/101 |
| 2012/0286118 A1* | 11/2012 | Richards | F16M 11/041 248/299.1 |
| 2013/0276212 A1* | 10/2013 | Lee-Holowka | A45F 5/00 2/271 |
| 2013/0279098 A1* | 10/2013 | Cho | H05K 7/00 361/679.01 |

FOREIGN PATENT DOCUMENTS

| | | |
|---|---|---|
| KR | 10-2011-0016335 | 2/2011 |
| KR | 20-0453348 | 4/2011 |
| KR | 10-1062557 | 9/2011 |
| KR | 10-1062570 | 9/2011 |
| KR | 10-2012-0035810 | 4/2012 |
| WO | 2012/086908 | 6/2012 |
| WO | 2012/096471 | 7/2012 |

OTHER PUBLICATIONS

Written Opinion with English Translation for International Application No. PCT/KR2014/002857, dated Jun. 25, 2014.

Joshua Jang; "iRing-Smart Grip & Smart Stand for Smart devices (designed by AAUXX)", Oct. 23, 2012; URL, https://www.youtube.com/watch?v=ffLGGNfhuCo.

* cited by examiner

MOBILE DEVICE ACCESSORY AND APPARATUS FOR MOUNTING THE SAME ON AN AUTOMOTIVE

CROSS-REFERENCE TO RELATED APPLICATIONS

This application claims priority under 35 USC §119 to Korean Patent Application No. 10-2013-0040554 filed on Apr. 12, 2013 and Korean Utility Application No. 20-2013-0010931 filed on Dec. 31, 2013, the contents of which are herein incorporated by reference in its entirety.

BACKGROUND OF THE INVENTION

1. Field of the Invention

Example embodiments of the present invention relate to a mobile device accessory and an apparatus for mounting the mobile device accessory on an automotive. More particularly, example embodiments of the present invention relate to a mobile device accessory for carrying or setting a mobile device and an apparatus for mounting a mobile device accessory on an automotive.

2. Description of the Related Art

Recently, a mobile device such as a mobile phone and a portable media player has come into wide use. Users have utilized various accessories to carry the mobile device easily. For example, a strap-type accessory which can bind one side of the mobile device helps the users to carry the mobile device conveniently.

While the mobile device generally operates while grasping the mobile device with hands, the mobile device may work occasionally with being positioned on a bottom face of a desk when the users watch a video for a long time.

The strap-type accessory may help the users to carry the mobile device conveniently, but it may be difficult to position the mobile device using the strap-type accessory. Thus, it may be necessary to use a mounting accessory additionally for positioning the mobile device on the bottom face.

Further, the mobile device has included a navigation function. Thus, it may be necessary to mount the mobile device on an automotive.

However, while an apparatus for mounting a mobile device having a strap type to helps the users to carry the mobile device conveniently, it may be very difficult to mount the mobile device on a particular position of the automotive using the strap-typed apparatus.

Meanwhile, when the mobile device is mounted on the particular position of the automotive with a different type apparatus, it may be necessary to fix the mobile device stably while driving the automotive. Further, it may be required to adjust a viewing angle at the particular position by rotating the mobile device in order for the users to watch the mobile device at various angles.

SUMMARY OF THE INVENTION

Example embodiments of the present invention provide a mobile device accessory for carrying or positioning a mobile device conveniently.

Example embodiments of the present invention provide an apparatus for mounting a mobile device on an automotive capable of fixing a mobile device to automotive securely and capable of rotating the mobile device at a particular position.

According to one aspect of the present invention, there is provided a mobile device accessory. The mobile device accessory includes a fixing plate to be fixed to a surface of a mobile device, a ring having an opening portion at a side thereof and a connecting member connecting the opening portion of the ring with the fixing plate such that the ring is configured to rotate to have various angles with respect to the fixing plate and an angle between the ring and the fixing plate is configured to maintain, the connecting member including a connecting block disposed at the opening portion of the ring, a connecting rod penetrating through both end portions of the ring having the opening and the connecting block to connect the ring with the connecting block, and an elastic part being interposed between the connecting block and the connecting rod and being disposed along a circumference of the connecting rod to provide a friction force between the connecting block and the connecting rod to suppress the connecting rod from naturally rotating against the connecting block.

In an example embodiment of the mobile device accessory, the connecting member may further include a fastening part affixing the connecting block to the fixing plate. Here, the fastening part may include a screw or a rivet. Further, the fastening part may pressurize the elastic part to heighten the friction force between the connecting block and the connecting rod.

In an example embodiment of the present invention, the connecting rod may include a flat face or an uneven face at an end portion thereof to suppress the connecting rod from rotating with respect to the ring.

In an example embodiment of the present invention, the ring may include a flat portion at one side opposite to another side at which the opening portion is formed to enlarge a contact area of the ring making contact with a bottom face. Here, a surface of the flat portion may include rubber to suppress the ring from sliding against the bottom face.

According to another aspect of the present invention, there is provided an apparatus for mounting an mobile device on an automotive. The apparatus includes a fixing plate to be fixed to a surface of a mobile device, a ring including an opening portion at one side thereof and a flat portion at another side to face the opening portion, a connecting member connecting the opening portion of the ring with the fixing plate such that the ring is configured to rotate to have various angles with respect to the fixing plate and an angle between the ring and the fixing plate is configured to maintain, the connecting member including a connecting block disposed at the opening portion of the ring, a connecting rod penetrating through both end portions of the ring having the opening and the connecting block to connect the ring with the connecting block, and an elastic part being interposed between the connecting block and the connecting rod and being disposed along a circumference of the connecting rod to provide a friction force between the connecting block and the connecting rod to suppress the connecting rod from naturally rotating with respect to the connecting block and a mounting member to be configured to be mounted on an automotive, the mounting member including a receiving groove to be configured to receive the flat portion downwardly and a release preventing groove to be configured to receive the connecting block for preventing the mobile device from leaving from the automotive.

In an example embodiment of the present invention, the mounting member may further include an attaching part having an adhesive pad on one surface thereof to be configured to be attached on the automotive and a receiving part being fixed to another surface of the attaching part, the receiving part including the receiving groove being formed at an upper portion thereof and the release preventing groove being formed at a lower portion thereof.

In an example embodiment of the present invention, the connecting member may further include a fastening part affixing the connecting block to the fixing plate.

In an example embodiment of the present invention, the connecting rod may include a flat face or an uneven face at an end portion thereof to suppress the connecting rod from rotating with respect to the ring.

According to example embodiments, the mobile device accessory includes the connecting rod penetrating through an inner portion of the connecting block and the elastic part having a sleeve type and surrounding the connecting rod to adjust the angle of the ring with respect to the fixing plate by an inner pressure and a friction force of the elastic part and to maintain a specific angle of the ring with respect to the fixing plate. Thus, the accessory can be mounted on the mobile device to set the mobile device at various angles conveniently. Further, the accessory may help the user to carry the mobile device easily. As a result, the accessory may be helpful to improve availability and serviceability of the mobile device.

Meanwhile, abrasion at a friction face between the connecting rod and the elastic part may be suppressed after a long-time operation compared with a screw connecting way or a pressure connecting way to improve a durability of the mobile device accessory. Further, the accessory have a simple structure to be assembled easily.

According to example embodiments, the apparatus for mounting the accessory on an automotive includes the mounting member having the receiving groove configured to receive the flat portion of the ring and the release preventing groove configured to prevent the mobile device from leaving such that the mobile device may be mounted on the automobile at various positions.

Both the connecting rod penetrating through an inner portion of the connecting block and the elastic part having a sleeve type and surrounding the connecting rod are provided to adjust the angle of the ring with respect to the fixing plate by an inner pressure and a friction force of the elastic part and to maintain a specific angle of the ring with respect to the fixing plate. Thus, the apparatus can be mounted on the mobile device to set the mobile device at various angles conveniently. Further, the apparatus may help the user to carry the mobile device easily. As a result, the apparatus may be helpful to improve availability and serviceability of the mobile device.

BRIEF DESCRIPTION OF THE DRAWINGS

The above and other features and advantages of the present invention will become more apparent by describing in detailed exemplary embodiments thereof with reference to the accompanying drawings, in which.

DESCRIPTION OF THE EMBODIMENTS

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, the sizes and relative sizes of layers and regions may be exaggerated for clarity.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/ or components, but do not preclude the presence or addition of one or more other features, integers, steps, operations, elements, components, and/or groups thereof.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the invention.

Unless otherwise defined, all terms (including technical and scientific terms) used herein have the same meaning as commonly understood by one of ordinary skill to in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 1:
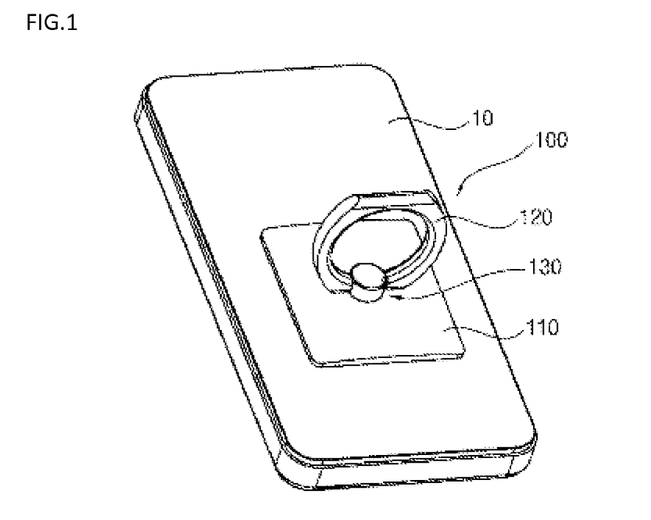
FIG. 1 is a perspective view illustrating a mobile device accessory mounted on a mobile device in accordance with an example embodiment of the present invention.
Figure 2:
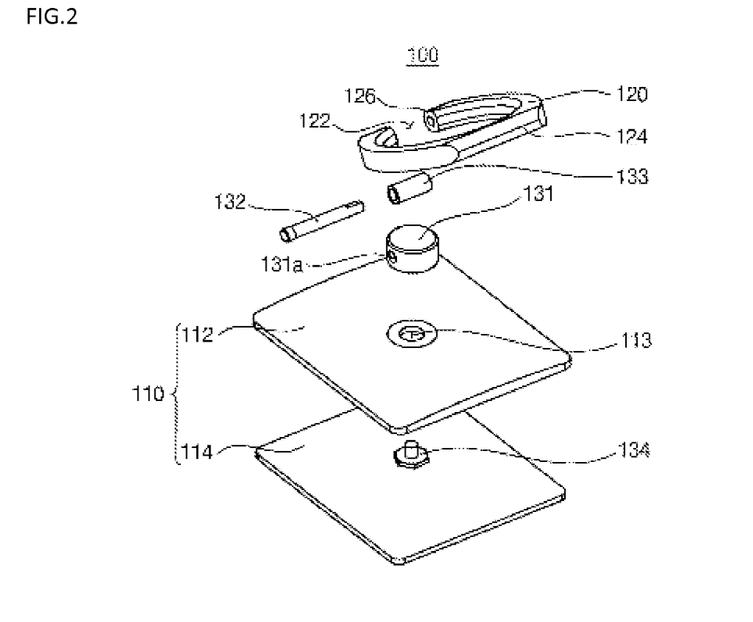
FIG. 2 is an exploded perspective view illustrating the accessory in FIG. 1.
Figure 3:
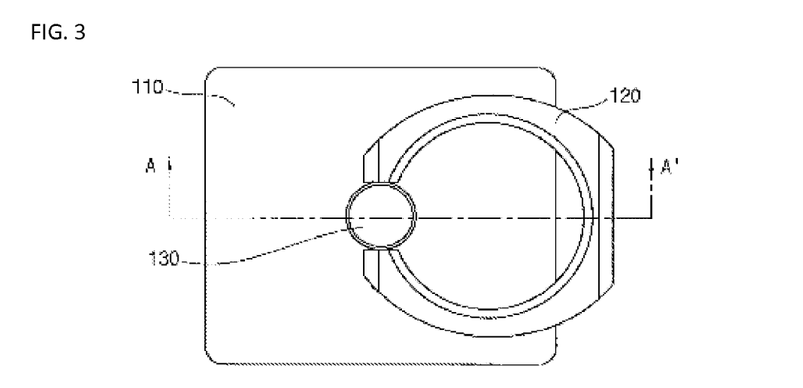
FIG. 3 is a plan view of the accessory in FIG. 1.
Figure 4:
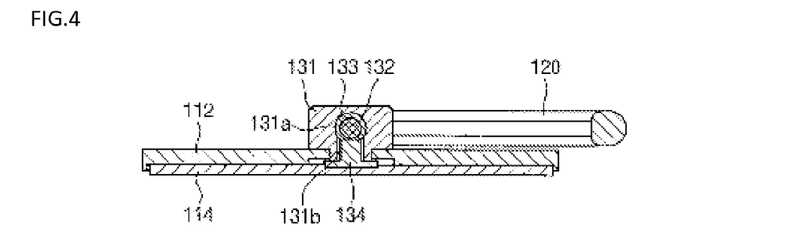
FIG. 4 is a cross sectional view taken along a line A-A' in FIG. 3.
Figure 5:
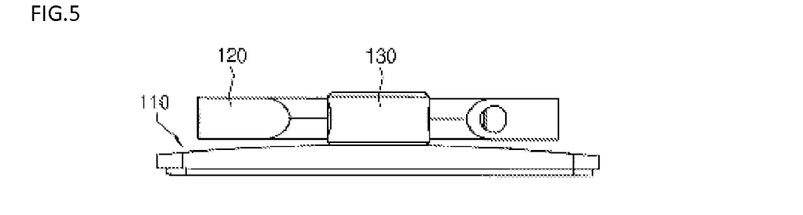
FIG. 5 is a front view of the accessory in FIG. 1.
Figure 6:
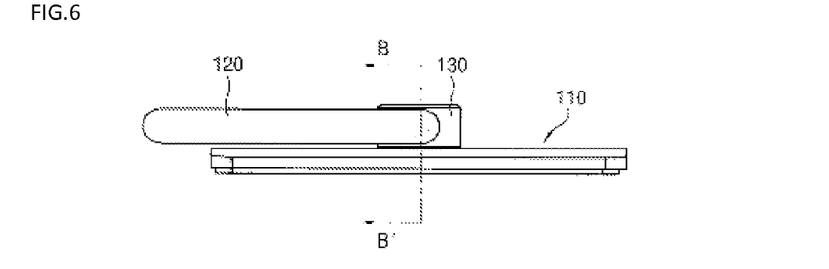
FIG. 6 is a side view of the accessory in FIG. 1.
Figure 7:
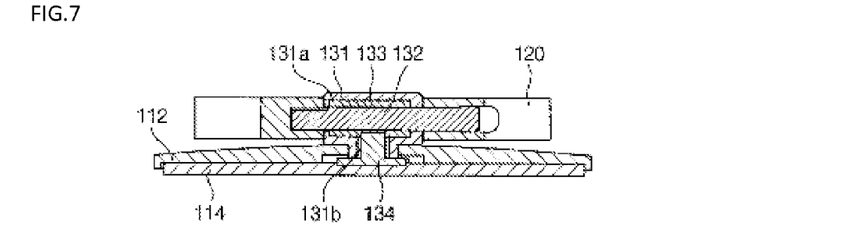
FIG. 7 is a cross sectional view taken along a line B-B' in FIG. 6.

FIG. 1 is a perspective view illustrating an accessory mounted on a mobile device in accordance with an example embodiment of the present invention. FIG. 2 is an exploded perspective view illustrating the accessory in FIG. 1. FIG. 3 is a plan view of the accessory in FIG. 1. FIG. 4 is a cross sectional view taken along a line A-A' in FIG. 3. FIG. 5 is a front view of the accessory in FIG. 1. FIG. 6 is a side view of the accessory in FIG. 1. FIG. 7 is a cross sectional view taken along a line B-B' in FIG. 6.

Referring to FIG. 1 to FIG. 7, an accessory mounted on a mobile device in accordance with an example embodiment of the present invention includes a fixing plate 110, a ring 120 and a connecting member 130.

The fixing plate 110 may be secured to a rear face of a mobile device 10 opposite to a front face having a screen. The mobile device 10 may be a cellular phone, a portable media player, a MP3 player, an electric dictionary, a tablet PC, etc. For example, the fixing plate 110 is secured to the rear face with facing the rear face of the mobile device 10. The fixing plate 110 may be attached to the rear face of the mobile device 10 using an adhesion material such as polyurethane, silicon, etc.

Particularly, the fixing plate 110 may include a first plate 112 and a second plate 114. The first plate 112 and the second plate 114 may be combined with each other. For example, the first plate 112 and the second plate 114 are combined with each other using an adhesion material. Alternatively, the first plate 112 and the second plate 114 may be combined either by engagement with concave-convex or by a screw.

The first plate 112 may include a first penetration hole 113. The first penetration hole 113 may be formed at a central portion of the first plate 112. A fastening part 134 such as a screw or a rivet may be positioned between the first plate 112 and the second plate 114 and through the first penetration hole 113 to be connected with a connecting block 131. Thus, the fixing plate 110 and the connecting member 130 may be connected with each other.

A trademark or a manufacturer name related to the mobile device 10 may be marked on one face of the first plate 112, which is opposite to the second plate 114.

The first plate 112 may be formed using a thermoplastic resin such as plastic material. Alternatively, the first plate 112 may be formed using a metal.

The second plate 114 may have a shape correspond to that of the first plate 112. The second plate 114 may have a concave-convex pattern (not shown) on a face which is opposite to the first plate 112. Therefore, since the second plate 114 includes the concave-convex pattern, a contact area between the second plate 114 and the rear face of the mobile device 10 may increase.

The second plate 114 may be formed using a adhesion material such as polyurethane or silicon. The second plate 114 may have characteristics that the adhesion material may not be easily torn. Therefore, the adhesion material may be suppressed from remaining on the rear face of the mobile device 10 when the fixing plate 110 is removed from the rear face of the mobile device 10. As a result, the mobile device 10 may be prevented from being contaminated by a residue of the adhesion material.

In case of removing the fixing plate 110 enforcedly, an adhesion force between the first plate 112 and the second plate 114 may be required to be higher than that between the rear face of the mobile device 10 and the second plate 114 in order to avoid the adhesion material to remain on the rear face of the mobile device 10.

The ring 120 may have a ring shape roughly with having an opening portion 122. The opening portion 122 may be formed at one side of the ring 120. The ring 120 may have a flat portion 124 at another side of ring 120, opposite to the opening portion 122. The flat portion 124 may enlarge a contact area between the ring 120 and a bottom face (not shown) when the ring 120 and the bottom face make contact with each other. In other words, the contact area between the flat portion 124 and the bottom face may be larger than a contact area between other portions of the ring 120 and the bottom face. Thus, the accessory 100 may support the mobile device 10 stably.

The flat portion 124 may include a surface formed using a rubber. Alternatively, the flat portion 124 may have a knurled surface. Thus, a friction force between the ring 120 and the bottom face may be enlarged to suppress the ring 120 from sliding against the bottom face.

The ring 120 may have a first rod hole 126. The first rod hole 126 may be to formed to penetrate through both end portions of the ring 120, which define the opening 122. The first rod hole 126 may extend in a direction parallel with the ring 120. The first rod hole 126 may have a cross section which does not have a perfect circular shape and has a partial rectangular shape having an even face.

The ring 120 may have a metal or a plastic material to be strong enough not to be easily broken.

The connecting member 130 connects the fixing plate 110 with the opening portion 122 of the ring 120 and is configured for the ring 120 to rotate by specific angles relative to the fixing plate 110 stage by stage.

The connecting member 130 includes a connecting block 131, a connecting rod 132 and an elastic part 133.

The connecting block 131 is positioned at the opening portion 122 of the ring 120. The connecting block 131 may have a width substantially identical to that of the opening portion 122. The connecting block 131 may be inserted into the opening portion 122 of the ring 120.

The connecting block 131 may have a disk shape having a specific thickness. Alternatively, the connecting block 131 may have a polygonal plate shape such as a rectangular plate, pentagonal plate, etc.

The connecting block 131 may have a second rod hole 131a and a second penetration hole 131b.

The second rod hole 131a is formed to penetrate through both side portions of the connecting block 131. The second rod hole 131a may pass through a central portion of the connecting block 131 horizontally. Because the connecting rod 132 is required to be inserted into the second rod hole 131a, the second rod hole 131a may have a diameter larger than that of the connecting rod 132.

The second penetration hole 131b may be formed vertically from a central bottom of the connecting block 131. The second penetration hole 131b may be communicated with the second rod hole 131a.

The connecting rod 132 connects the ring 120 with the connecting block 131. In detail, the connecting rod 132 may be inserted into both the first rod hole 126 formed at both end portions of the ring 120 defining the opening 122 and second rod hole 131a of the connecting block 131. The connecting rod 132 may have a metal or a plastic material having a relatively high hardness.

Figure 8:
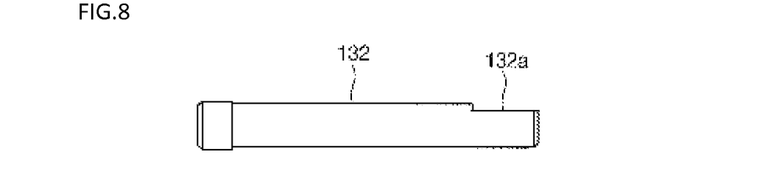
FIG. 8 is a side view of a connecting rod in FIG. 2.

FIG. 8 is a side view of a connecting rod in FIG. 2.

Referring to FIG. 8, the connecting rod 132 may have a flat face 132a. The flat face 132a may be formed at an end portion of the connecting rod 131 along a longitudinal direction. When the connecting rod 132 is inserted into the first rod hole 126 of the ring 120, the flat face 132a may correspond to the even face of the first rod hole 126 to fix the connecting rod 132 to the ring 120. Thus, the connecting rod 132 may rotate together with the ring 120.

The second rod hole 131a may have a cross section of a perfect circular shape, the connecting rod 132 may not be fixed to the connecting block 131. Thus, the connecting rod 132 may revolve freely with respect to the connecting block 131.

Figure 9:
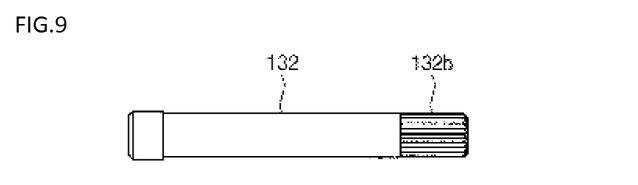
FIG. 9 is a side view of a connecting rod in accordance with another example embodiment of the present invention.

FIG. 9 is a side view of a connecting rod in accordance with another example embodiment of the present invention.

Referring to FIG. 9, the connecting rod 132 may have a concave-convex face 132a. The concave-convex face 132a may be formed on a circumference of an end portion of the connecting rod 132 along a longitudinal direction.

When the concave-convex face 132a is formed on the end portion of the connecting rod 132, a concave-convex face may be additionally formed at an inner face of the first rod hole 126 of the ring 120. Thus, when the connecting rod 132 is inserted into the first rod hole 126, the concave-convex face 132a is engaged with the concave-convex face of the first rod hole 126 to fix the connecting rod 132 to the ring 120. Therefore, the connecting rod 132 may be rotatable together with ring 120.

The elastic part 133 is interposed between the connecting block 131 and the connecting rod 132 and is positioned along a circumference of the connecting rod 132.

The elastic part 133 may have a sleeve shape surrounding an outer circumference surface of the connecting rod 132. For example, the elastic part 133 is inserted into the second rod hole 131a of the connecting block 131 to surround the connecting rod 132. In other words, the elastic part 133 may fit into the connecting rod 132.

The elastic part 133 may be formed using a elastic material having an elastic property and a constant coefficient of friction. For example, the elastic part 133 may include engineering plastic having a good abrasion resistance, such as polyacetal resin, MC Nylon®, polyurethane, polyisoprene, polybutadiene rubber, polyacrylate rubber, polyether rubber, etc.

The elastic part 133 may generate a specific pressure and a friction force between the connecting block 131 and the connecting rod 132. The elastic part 133 to provide both the connecting block 131 and the connecting rod 132 with the friction force. The friction force caused by the elastic part 133 may prevent the connecting rod 132 from naturally revolving with respect to the connecting block 131.

When an external force may be applied larger than the friction force, the connecting rod 132 may revolve with respect to the connecting block 131. Thus, the external force is applied to the ring 120 which is connected to the connecting rod 132 to rotate the ring 120 by various angles with respect to the fixing plate 110 secured to the connecting block 131.

When the external force is removed, the connecting rod 132 is not rotatable with respect to the connecting block 131 due to the friction force such that the connecting block 131 may be secured. Therefore, the ring 120 may keep the constant angle with respect to the fixing plate 110.

As a result, the ring 120 may be adjusted to have various angles with respect to the fixing plate 110 and may maintain a specific angle with respect to the fixing plate 110.

In an example embodiment of the present invention, the connecting member 130 may further include a fastening part 134.

The fastening part 134 may fasten the fixing plate 110 to the connecting block 131. In particular, the fastening part 134 may fasten the fixing plate 110 to the connecting block 131 by a screwing way or a riveting way. In this case, the fastening part 134 may include a screw or a rivet.

The fastening part 134 may pass from a lower face of the first plate 112 to the second penetration hole 131b of the connecting block 131 through the first penetration hole 113. The fastening part 134 may pressurize the elastic part 133 to press the elastic part 133 toward to the connecting rod 132. Thus, the friction force between the elastic part 133 and the connecting rod 132 may increase.

Further, a penetration depth by which the fastening part 134 penetrates through the second penetration hole 131b of the connecting block 131 may be adjusted to control the friction force between the elastic part 133 and the connecting rod 132.

In an example embodiment of the present invention, the fastening part 134 may be fixed to a central bottom of the connecting block 131 and the fastening part 134 may be fastened to the fixing plate 110 such that the connecting block 131 may be fixed to the fixing plate 110.

The accessory 110 includes the ring 120 capable of being rotatable by various angles and maintaining a rotated status. In particular, when a user applies an external force bigger than the friction force of the elastic part 133 to revolve the ring 120 secured to the connecting rod 132, the connecting rod 132 may overcome the friction force to be rotatable. The ring 120 may rotate by various angles in a range of 0 degree to 180 degree.

When the external force is removed at the state that the ring 120 rotates by a specific angle, the connecting rod 132 may be kept without rotating due to the friction force of the elastic part 133. Thus, the ring 120 may maintain the angle with respect to the fixing plate 110.

The accessory 100 fixed to the mobile device 10 may keep the status of the ring 120 being substantially parallel with the fixing plate 110. Further, the ring 120 to may rotate to keep the status being substantially vertical to the fixing plate 110 in order to carry or set the mobile device 10 conveniently. When a finger of the user is inserted in the ring 120 of the accessory 100, the user may carry the mobile device conveniently to improve transportability of the mobile device. Furthermore, when the mobile device 10 is positioned on a bottom face of a table with keeping a specific angle of the ring 120 such as 45 degrees or 90 degrees, etc. with respect to the fixing plate, both a side portion of the mobile device 10 and the flat portion 124 of the ring 120 makes contact with the bottom face. Therefore, the mobile device may be set on the bottom face safely.

Figure 10:
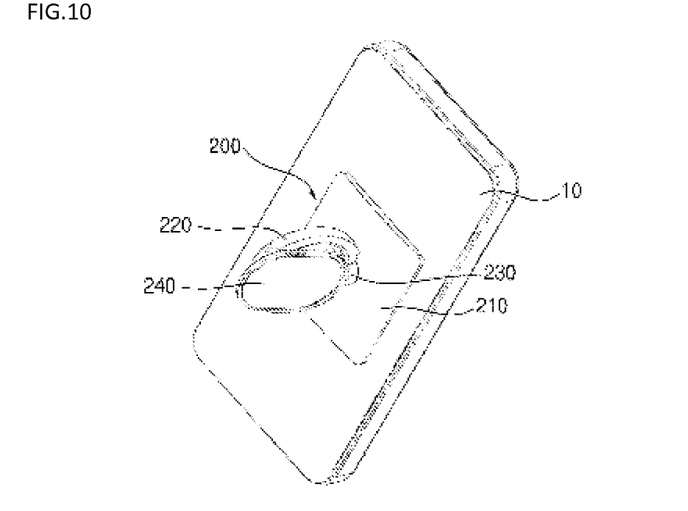
FIG. 10 is a perspective view illustrating an apparatus for mounting a mobile device on an automotive with an example embodiment of the present invention.
Figure 11:
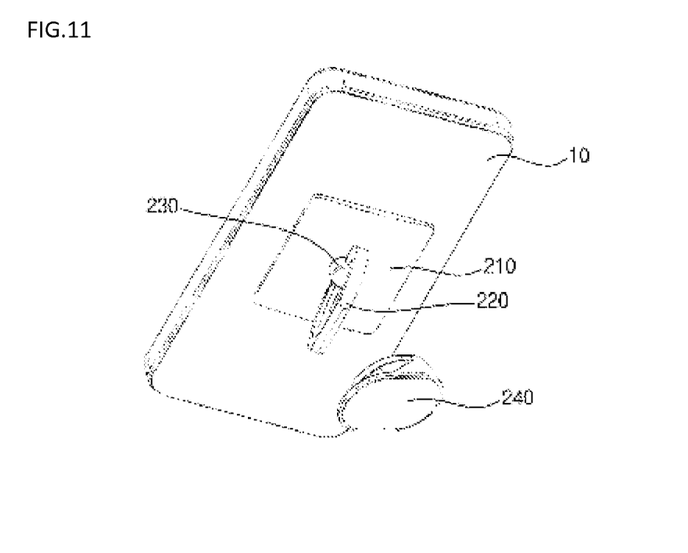
FIG. 11 is an exploded perspective view illustrating the apparatus in FIG. 10 by disassembling a mounting member from a ring.
Figure 12:
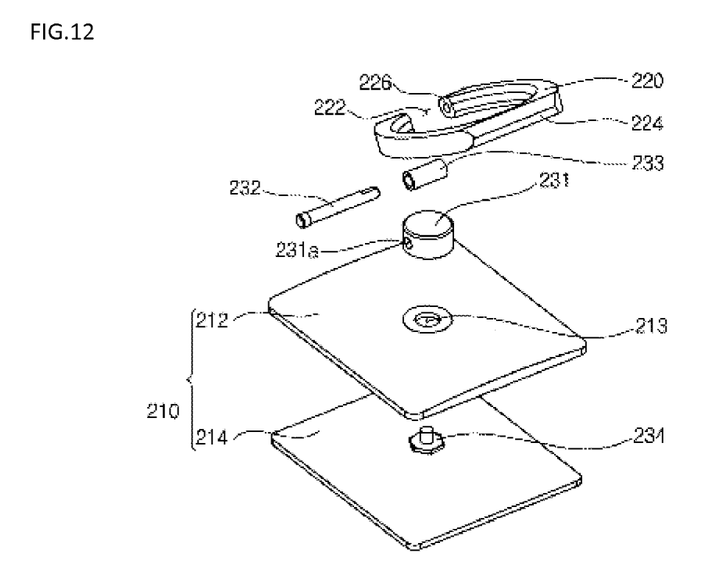
FIG. 12 is an exploded perspective view illustrating a fixing plate, a ring and a connecting member in FIG. 10.
Figure 13:
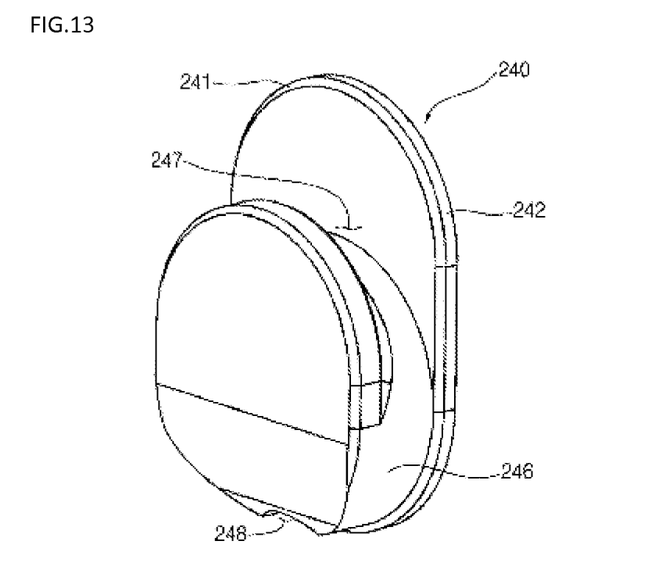
FIG. 13 is an perspective view illustrating a mounting member in FIG. 10.

FIG. 10 is a perspective view illustrating an apparatus for mounting a mobile device on an automotive with an example embodiment of the present invention. FIG. 11 is a perspective view illustrating the apparatus in FIG. 10 with disassembling a mounting member from a ring. FIG. 12 is an exploded perspective view illustrating a fixing plate, a ring and a connecting member in FIG. 10. FIG. 13 is an perspective view illustrating a mounting member in FIG. 10.

Referring to FIGS. 10 to 13, an apparatus 200 for mounting an mobile device on an automotive in accordance of example embodiments of the present invention includes a fixing plate 210, a ring 220, a connecting member 230 and a mounting member 240.

The fixing plate 210, the ring 220 and the connecting member 230 include elements substantially identical to those of the fixing plate 110, the ring 120 and the connecting member 130 in FIGS. 1 to 9. Thus, any further illustration of the fixing plate 210, the ring 220 and the connecting member 230 are omitted therein.

The mounting member 240 is mounted on a automotive. For example, the mounting member 240 is mounted on a proper position such as a dashboard or a audio panel of the automotive, at which a driver can view the mobile device clearly.

The mounting member 240 may include a receiving groove 247 to receive the a flat portion 224 of the ring 220 downwardly. Thus, the ring 220 is secured to the mounting member 240. The mounting member 240 may include a release preventing groove 248 to receive the connecting block 231 to prevent the mobile device 10 from leaving from the automotive. Thus, the flat portion 224 of the ring 220 is received into the receiving groove 247 and the connecting block 231 of the connecting member 230 is received into the release preventing groove 248 to mount the mobile device 10 on the automotive stably.

In some embodiments, the mounting member 240 may include an attaching part 241 and a receiving part 246.

The attaching part 241 may include an adhesive pad formed on one surface thereof to adhere the attaching part 241 to the automotive. The attaching part 241 may have a plate shape. Thus, since the attaching part 241 include the adhesive pad, the mobile device 10 may be easily attached to the automotive at any inner positions of the automotive regardless of a surface condition of the automotive The receiving part 246 may be fixed to another surface of the attaching part 241. The receiving part 246 may include the receiving groove 247 formed at an upper portion thereof and the release preventing groove 248 at a lower portion thereof. The receiving part 246 may have a U shape. The connecting block 231 may be to inserted into the release preventing groove 248. Further, a gap may exist between the release preventing groove 248 and the connecting block 231 to adjust angle between the fixing plate 210 and a plane defined by the ring 220. For example, when the connecting block 231 gradually leaves from the release preventing groove 248, the angle between the fixing plate 210 and the plane defined by the ring 220 may increase. As a result, the angle between the fixing plate 210 and the plane defined by the ring 220 may be adjusted considering a viewing angle at which a driver views the mobile device.

According to example embodiments, the accessory may be attached to the mobile device and the ring may be adjusted by various angles to carry or set the mobile device conveniently. Further, the accessory have a simple structure to be manufactured easily to improve a productivity of the accessory.

Meanwhile, the apparatus for mounting a mobile device on an automotive may be mounted on the automotive regardless of an inner position of the automotive. Further, the ring may be rotatable to adjust an angle with respect to the fixing plate such that the mobile device may be easily set to the automotive. Further, the apparatus has a simple structure to be manufactured easily to improve a productivity of the apparatus.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of the present invention. Accordingly, all such modifications are intended to be included within the scope of this invention as defined in the claims. In the claims, means-plus-function clauses are intended to cover the structures described herein as performing the recited function and not only structural equivalents but also equivalent structures. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

What is claimed is:

1. A mobile device accessory comprising:
a fixing plate to be fixed to a surface of a mobile device;
a ring having an opening portion at a side thereof; and
a connecting member connecting the opening portion of the ring with the fixing plate such that the ring is configured to rotate to have various angles with respect to the fixing plate and an angle between the ring and the fixing plate is configured to maintain, the connecting member including a connecting block disposed at the opening portion of the ring, a connecting rod penetrating through both end portions of the ring having the opening and the connecting block to connect the ring with the connecting block, and an elastic part being interposed between the connecting block and the connecting rod and surrounding the connecting rod along a circumference of the connecting rod to provide a friction force between the connecting block and the connecting rod to suppress the connecting rod from naturally rotating against the connecting block,
wherein the connecting member further includes a fastening part affixing the connecting block to the fixing plate, and
wherein the fastening part pressurizes the elastic part to heighten the friction force between the connecting block and the connecting rod.

2. The mobile device accessory of claim 1, wherein the fastening part includes a screw or a rivet.

3. The mobile device accessory of claim 1, wherein the connecting rod includes a flat face or an uneven face at an end portion thereof to suppress the connecting rod from rotating with respect to the ring.

4. A mobile device accessory comprising:
a fixing plate to be fixed to a surface of a mobile device;
a ring having an opening portion at a side thereof; and
a connecting member connecting the opening portion of the ring with the fixing plate such that the ring is configured to rotate to have various angles with respect to the fixing plate and an angle between the ring and the fixing plate is configured to maintain, the connecting member including a connecting block disposed at the opening portion of the ring, a connecting rod penetrating through both end portions of the ring having the opening and the connecting block to connect the ring with the connecting block, and an elastic part being interposed between the connecting block and the connecting rod and surrounding the connecting rod along a circumference of the connecting rod to provide a friction force between the connecting block and the connecting rod to suppress the connecting rod from naturally rotating against the connecting block,
wherein the ring includes a flat portion at one side opposite to another side at which the opening portion is formed to enlarge a contact area of the ring making contact with a bottom face.

5. The mobile device accessory of claim 4, wherein a surface of the flat portion includes rubber to suppress the ring from sliding against the bottom face.

6. The mobile device accessory of claim 4, wherein the connecting rod includes a flat face or an uneven face at an end portion thereof to suppress the connecting rod from rotating with respect to the ring.

7. An apparatus for mounting a mobile device on an automotive, the apparatus comprising:
a fixing plate to be fixed to a surface of a mobile device;
a ring including an opening portion at one side thereof and a flat portion at another side to face the opening portion;
a connecting member connecting the opening portion of the ring with the fixing plate such that the ring is configured to rotate to have various angles with respect to the fixing plate and an angle between the ring and the fixing plate is configured to maintain, the connecting member including a connecting block disposed at the opening portion of the ring, a connecting rod penetrating through both end portions of the ring having the opening and the connecting block to connect the ring with the connecting block, and an elastic part being interposed between the connecting block and the connecting rod and being disposed along a circumference of the connecting rod to provide a friction force between the connecting block and the connecting rod to suppress the connecting rod from naturally rotating with respect to the connecting block; and
a mounting member to be configured to be mounted on an automotive, the mounting member including a receiving groove to be configured to receive the flat portion downwardly and a release preventing groove to be configured to receive the connecting block for preventing the mobile device from leaving from the automotive.

8. The apparatus of claim 7, wherein the mounting member further includes:
an attaching part having an adhesive pad on one surface thereof to be configured to be attached on the automotive; and
a receiving part being fixed to another surface of the attaching part, the receiving part including the receiving groove being formed at an upper portion thereof and the release preventing groove being formed at a lower portion thereof.

9. The apparatus of claim 7, wherein the connecting member further includes a fastening part affixing the connecting block to the fixing plate.

10. The apparatus of claim 7, wherein the connecting rod includes a flat face or an uneven face at an end portion thereof to suppress the connecting rod from rotating with respect to the ring.

* * * * *